Feb. 28, 1967 C. J. GRIMLAND 3,306,539

ANALOG-TO-DIGITAL CONVERTER

Filed Oct. 6, 1964

4 Sheets-Sheet 1

INVENTOR
CHARLES J. GRIMLAND

BY Alexander & Dowell

ATTORNEYS

INVENTOR
CHARLES J. GRIMLAND
BY Alexander & Dowell
ATTORNEYS

INVENTOR
CHARLES J. GRIMLAND
BY Alexander & Dowell
ATTORNEYS

INVENTOR
CHARLES J. GRIMLAND

BY Alexander & Dowell
ATTORNEYS

United States Patent Office 3,306,539
Patented Feb. 28, 1967

3,306,539
ANALOG-TO-DIGITAL CONVERTER
Charles J. Grimland, Garland, Tex., assignor to The Geotechnical Corporation, a corporation of Delaware
Filed Oct. 6, 1964, Ser. No. 401,844
20 Claims. (Cl. 235—201)

This invention relates to logical systems, and more particularly relates to analog-to-digital converter systems including circuitry which advantageously employs fluid circuit techniques and components.

A practical working embodiment of the present invention is illustrated and described in terms of a calipering system using series-connected mechanical actuators as suggested in Patents 2,969,042, 2,197,867, 2,010,158 and others, and the present embodiment also using pneumatic gates, valves and actuators forming monostable oscillators, bistable oscillators, ring counters, and other sub-circuits which are analogous in a general way to electronic circuitry, but which are simpler and cheaper to manufacture, and in some respects more dependable.

It is a principal object of this invention to provide an improved system for accepting an analog value, such as a dimension, and for presenting this value in digital terms which may employ a decimal system of numbers, or any other number system.

Another major object of this invention is to provide a system employing a trial-and-error sampling sequence in which the total number of trials need never exceed the number of bits inherent in the group of mechanical actuators performing the sampling sequence, this purpose being accomplished by first sampling the most significant bit, and then sampling in decreasing increments thereafter.

Still another object of the invention is to provide a system employing separate groups of tandem mechanical actuators respectively for sampling and for read-out purposes, the latter having much larger increments of motion than the former and being slaved thereto so as to provide instantaneous read-out on an amplified scale of increments.

It is a further important object to provide a novel logical system for controlling the sampling and the reset sequences, this system including a sensing head which delivers one of three possible responses for each sampling increment, respectively indicating to the system that the increment was "too-long," "too-short," or just right, the latter being referred to hereinafter as the "null" condition of the system. These three possible responses control the logical system and determine what the next sampling increment should be, and when the system is nulled and should therefore cease sampling.

A further object of the invention is to provide novel and improved fluid sub-circuits having general utility when used in other combinations to provide different useful systems.

Other objects and advantages of the invention will become apparent during the following discussion of the drawings, wherein:

FIGS. 1*a*, 1*b*, and 1*c* comprise a composite pneumatic circuit diagram when read together, showing one practical embodiment of an analog-to-digital converter system used for determining a linear dimension of a workpiece;

*General description*

Figure 1A:
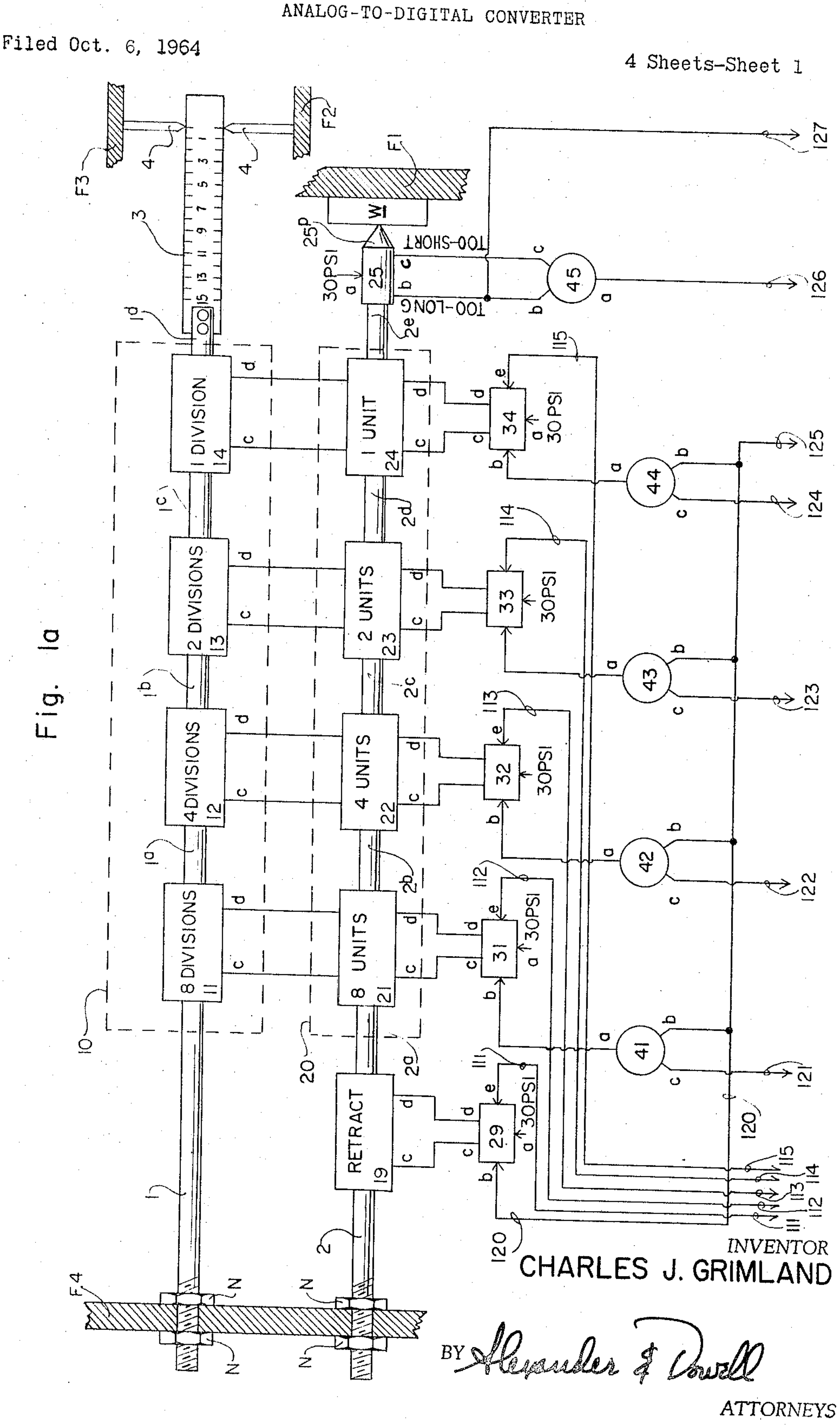
Figure 1B:
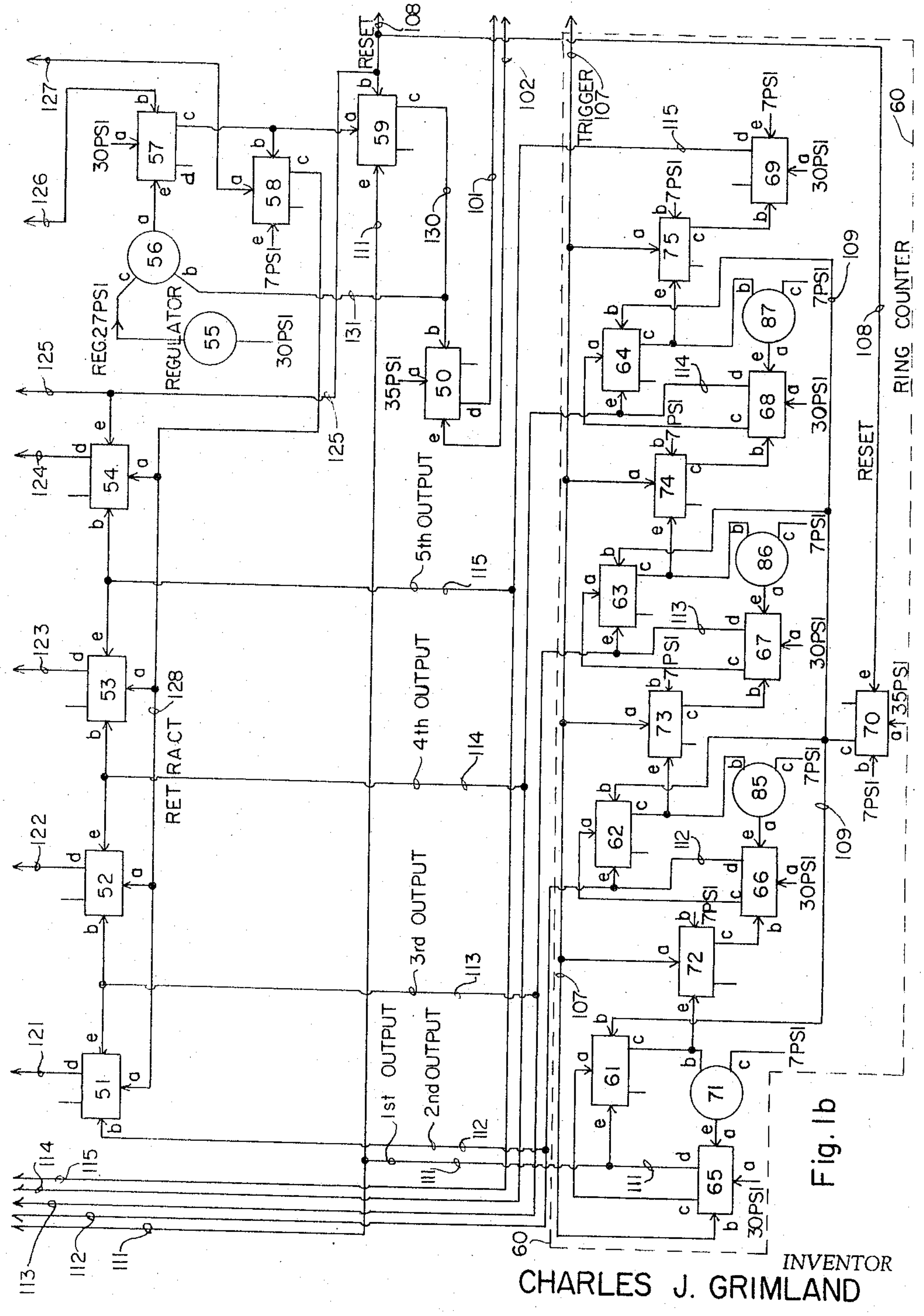
Figures 1C, 2:
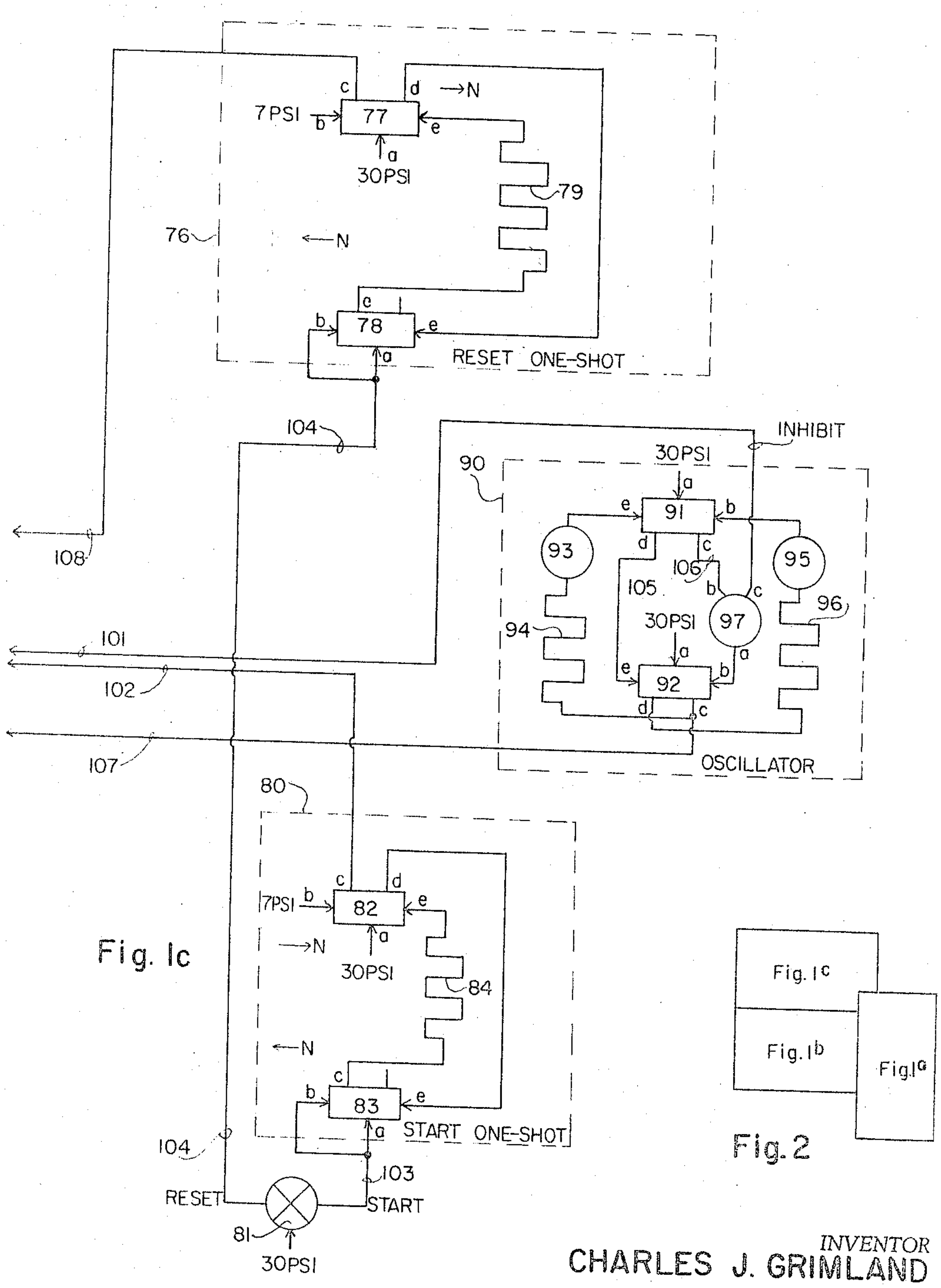
FIG. 2 is a block diagram showing the relative positions in which the FIGS. 1*a*, 1*b*, and 1*c* should be oriented in order to form one unified diagram of said embodiment.

Referring now to the composite drawings including FIGS. 1*a*, 1*b*, and 1*c*, mutually oriented as in FIG. 2, the present system includes a machine frame represented partially by stationary frame members F1, F2, F3 and F4. The frame member F1 serves as a support for a workpiece W which is to be gauged, or calipered, between the frame member F1 and a movable gauging head located directly to the left of the workpiece W.

The frame member F4 supports a pair of rods 1 and 2 fixed therein by nuts N or other suitable means, and these rods are divided into additional lengths of rod labeled 1*a*, 1*b*, 1*c*, and 1*d*, and labeled 2*a*, 2*b*, 2*c*, 2*d*, and 2*e*, respectively. The rods 1 and 2 are stationary, and support series-connected piston and cylinder actuators. The rod 1 supports pneumatic actuators 11, 12, 13, and 14, and the rod 2 supports pneumatic actuators 21, 22, 23, and 24, and gauge head 25.

Figure 3:
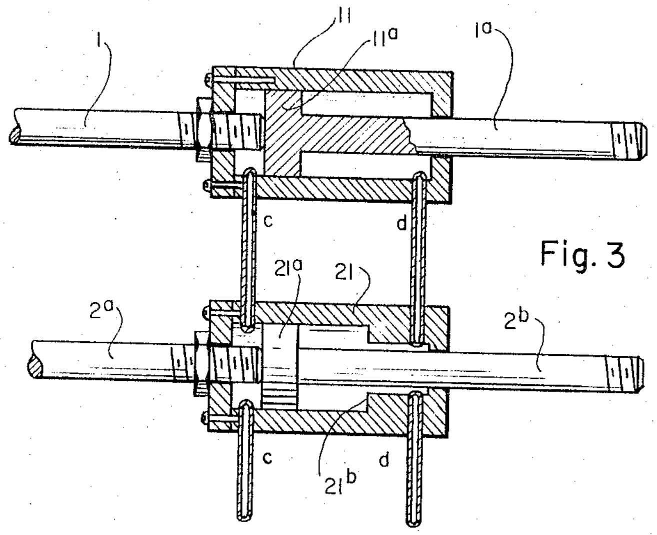
FIG. 3 is a cross-sectional detail view showing an exemplary pneumatic piston and cylinder actuator forming part of the illustrated embodiment, and repeated in several different locations therein.

Detailed views of typical pneumatic actuators are shown in FIG. 3, which illustrates the rods 1 and 2*a* respectively supporting pneumatic actuators 11 and 21. These actuators have pneumatic pistons 11*a* and 21*a*, and these pistons are integrally connected with rods 1*a* and 2*b* respectively. The distance of travel of piston 21*a* within its cylinder is accurately limited to a very definite increment, and the total distance of horizontal travel of the gauge head 25 with respect to the fixed frame member F1 is determined by the number of cylinders 21, 22, 23, and 24, which are in extended position. Likewise, the distance of travel of the read-out scale 3 with respect to the pointers 4, supported on frame members F2 and F3, is dependent upon the number of pneumatic cylinders "11, 12, 13, and 14" which are in extended position at any particular moment, and upon the linear travel which each cylinder can contribute to the total horizontal movement of the rod 1*d* which is attached to, and supports the scale 3. As shown in FIG. 3, each upper cylinder in the general group 10 of actuators is coupled by suitable tubing in parallel with a corresponding pneumatic cylinder in the group 20 of actuators. These various pneumatic actuators are capable of contributing different increments of motion. For example, the cylinders 11 and 21 can contribute 8 units of linear motion, cylinders 12 and 22 can contribute 4 units of motion, cylinders 13 and 23 can contribute 2 units of motion, and cylinders 14 and 24 can contribute one unit of motion, totalling 15 units of possible motion, for instance thousandths of an inch in the lower group 20 of actuators. Finally, there is a RETRACT cylinder 19 which is of the same basic structure as the other pneumatic cylinders except that it has a much larger total piston displacement exceeding the composite movement of the group 20 of actuators, and this cylinder 19 serves to withdraw the gauge head 25 out of contact with the workpiece W so as to permit a different workpiece to be inserted and gauged against the frame member F1.

As will be discussed in greater detail below in connection with FIG. 6, the gauge head comprises a valve having three positions. Normally it is extended to the rightmost position, and in this position it puts out a signal indicating that the motion of the shaft 2*e* toward the workpiece W was "too short." On the other hand, if the rightward motion of the rod 2*e* is too great, the sliding valve in the gauge head is moved leftwardly and puts out a different signal indicating that the motion of the mechanism was "too long" and that the gauge abutted the workpiece W and was displaced by a distance greater than the distance required to center the valve in the gauge head. Finally, when the actuators 21, 22, 23, and 24 extend the gauge head 25 by an amount which contacts the workpiece W and centers the valve in the gauge head 25, the thickness of the workpiece is then found and is read out on the strip 3, and as a result of centering the valve in the gauge head 25, it delivers a signal at both of its outputs, but at a lesser pressure than either the "too long" or the "too short" signal, and this "null" signal indicates to the external circuitry that the thickness of the workpiece W has been successfully measured. The correct combination of pneumatic actuators which should be extended to properly measure the thickness of the workpiece W is determined by a trial-and-error sequence which is employed sometimes in the binary computer art.

The pneumatic cylinders constituting the actuator group 10 are directly connected in parallel with the corresponding cylinders constituting the caliper actuator group 20, but their increment of motion is very much greater so that they move a visual gauge scale 3 through distances which are easily seen by the operator, whereby the readout scale motion is amplified.

The remaining pneumatic circuitry comprising FIGS. 1*a*, 1*b*, and 1*c* illustrates a system of pneumatic components which perform two different functions: First, they successively step the actuators 20 in a logical series of trial-and-error movements until the gauge head 25 indicates correct measurement of the thickness of the workpiece W. Second, this circuitry presents this analog information in digital form at the gauge scale 3, and provides means whereby the system can be reset in preparation for similar measurements performed upon other workpieces W. When a nulled condition is reached, the sequence is broken and the system remains quiescent until manually reset and manually started upon a new measuring sequence.

The initial measuring step in a sequence moves the gauge head out 8 scale units (for instance thousandths of an inch), which amounts to half of its travel. If the gauge head sends back a "null" reading, it has then indicated that this was the correct measurement. If the gauge head sends back a "too short" indication, it moves through a cycle of retracting and then advancing a greater distance, and this sequence continues until a nulled condition is reached. On the other hand, if the gauge head contacts the workpiece substantially before it has gone out 8 scale units, it sends back a "too long" response, and retracts. Then upon a subsequent extension, it advances through a lesser increment seeking a "null" reading.

The total increment of travel of the gauge head 25 during any cycle of operation depends upon how many of the pneumatic cylinders 21, 22, 23, and 24 are in extended position, and how many are in retracted position, and upon the number of scale units which each of the cylinders contributes. These increments, in the present example are, respectively, equal to 8 scale units, 4 scale units, 2 scale units, and one scale unit, so that a combination of increments contributed by these actuator cylinders can move the gauge head through any distance from zero to 15 units. In the practical working embodiment of the present system, these units are thousandths of an inch. However, it can readily be seen that by adjusting the position of the stationary support member F1, any thickness of workpiece W can be introduced, and its thickness measured, provided the total variation of thickness does not exceed 15 thousandths of an inch. Of course, any other unit of measurement can be employed by changing the increment of motion contributed by each actuator cylinder or by changing the total number of actuators.

The upper row of cylinders 11, 12, 13, and 14 are slaved to the lower row of cylinders 21, 22, 23, and 24, and the upper row need only produce divisions of motion which can be clearly read on the scale. For instance, if the unit of motion in the lower row of cylinders is thousandths of an inch, it might be convenient to use ⅛-inch divisions as the unit of motion in the upper row.

*Actuators*

FIG. 3 shows details of a typical pair of cylinder actuators which are slaved together. It will be seen that the engagements of the rods 1 and 2*a* in the left ends of the cylinders 11 and 21 are threaded, and that the rod extends into the cylinder and is adjustably secured in place as a stop against which the pistons 11*a* and 21*a* can abut when the pistons are in fully retracted position, as shown in FIG. 3. Each of the pistons 11*a* and 21*a* is connected to another short rod 1*a* and 2*b*, respectively, and these rods are threaded at their outer ends, and screwed into cylinders 12 and 22 respectively. The fact that the upper and lower actuators 11 and 21 have different increments of motion is indicated in FIG. 3 by the provision of a shoulder 21*b* inside the latter cylinder. The retract cylinder 19 is fully advanced for each trial-and-error measuring sequence of the system, and then is fully retracted when the sequence is completed and the system is reset. In this way, the changing of the workpiece is greatly facilitated.

*Sequencing components*

The successive cyclic extensions of the gauge head toward the workpiece W are timed by an oscillator 90 which is normally free-running, but can be blocked by the application of a signal to input 97*c*, FIG. 1*c*. This oscillator 90 delivers output from 92*c* which takes the form of spaced pulses which trigger a ring counter 60 and cause it to step, sequentially delivering separate outputs in the form of pressure pulses from different valve units within the ring counter, these outputs being labeled 1st, 2d, 3d, 4th and 5th across the center of FIG. 1*b*. These stepped outputs control the sequence of operation of the actuating cylinders in the upper and lower rows across FIG. 1*a*, but this sequence is also partly controlled by outputs 25*b* and 25*c* from the gauge head 25, these latter outputs controlling logic circuits to determine whether the actuator cylinders are advanced or retracted in response to whether the output from the gauge head 25 is from output 25*b* representing a "too long" response, or whether the output appears at 25*c* representing a "too short" response.

Figure 5:
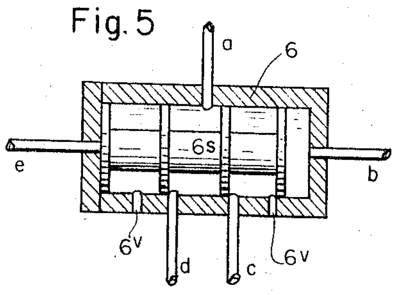
FIG. 5 is a cross-sectional detail view of a spool valve which is characteristic of all such valves appearing in a number of locations in the illustrative embodiment.

The details of the circuit operation will be given with reference to several types of components which are substantially standard throughout the system. All of the rectangular blocks shown in the diagram of FIG. 1 and which have five air lines extending thereinto are identical with the detail view shown in FIG. 5 illustrating a valve body 6 having seven ports extending to it, of which two are vents as shown in FIG. 5 at 6*v*. Air pressure is injected into the valve at 6*a* and the spool 6*s* is shuttled back and forth depending on whether the pressure at 6*e* is greater than at 6*b*, or less. In the position shown in FIG. 5, output 6*d* will receive air from inlet 6*a* while 6*c* is vented to the right-hand vent 6*v*. If the air pressure becomes greater at 6*e* than at 6*b*, the spool 6*s* will be shifted to the right, providing a pressure output at 6*c* and venting 6*d*. All of the five-line valves in the system's diagram are identical with the ones shown in FIG. 5.

Figure 4:
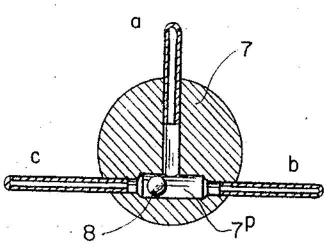
FIG. 4 is a cross-sectional detail view illustrating an "OR" gate which is characteristic of a plurality of OR gates appearing in the above embodiment.

Another common component includes all circles having three air lines going thereto. These circles represent OR-gates, as shown in FIG. 4, and these OR-gates include a body 7 having a passage 7*p* containing a ball 8. If air pressure is inserted at 7*c* or 7*b*, the ball 8 will move to the end of the passage 7*p* having the lesser pressure, and air from the end having the greater pressure will pass outwardly through line 7*a*. In this way, no air can be blown from 7*c* or 7*b*, or vice versa, but air blown in either 7*c* or 7*b* will come out of 7*a* at a pressure which equals the greater of the two input pressures.

*Details of circuit operation*

As stated above, the sequence of circuit operation is controlled by the ring counter 60 which is successively pulsed by the oscillator 90 except when the latter is blocked by pressure introduced at 97*c* from pressure line 101. Whenever there is no pressure on the line 101, the oscillator 90 continuously steps the ring counter 60 as will be presently described.

Assume for the sake of commencing the sequence that the spool within the valve 50, FIG. 1*b* is initially in its leftmost position so that pressure at 35 p.s.i. from 50*a* is delivered at 50*d* to the line 101 for the purpose of inhibiting the operation of the oscillator 90. In this condition, the system lies dormant until the manual control valve 81 is moved to such a position that it delivers a pulse from a 30 p.s.i. source to the "start" line 103. The manual valve 81 is of the type which delivers no output when it is centered, but which delivers output to line 103 as it is moved to the right, or to line 104 as it is moved to the left, the latter being a position used for resetting the system in the manner to be described hereinafter.

The one-shot oscillator 80 shapes a "start" pulse of measured duration. In this oscillator, before the "start" line 103 is manually pressurized using the control valve 81, the spool in valve 83 is normally in the leftmost position as shown by the adjacent arrow N, and the spool in the valve 82 is normally in the rightmost position as shown by the adjacent arrow N, and is held therein by the 7 p.s.i. bias applied at 82*b*. Therefore, the line 102 is vented at 82*c* and the valve ports 82*d* and 83*e* are pressurized to 30 p.s.i. from the valve port 82*a*. This is a stable condition to which the one-shot 80 returns and in which it remains in the absence of pressure input to port 83*b* through "start" line 103. Component 84 comprises an impedance to the flow of air taking the form of a pneumatic resistor having a series of small tortuous paths through a block, in a manner well known per se. Thus, the stable condition of the one-shot multivibrator provides no output to line 102. The one-shot 80 serves the principal purpose of shaping a "start" pulse and providing it with a definite maximum duration.

When the control valve 81 is manually operated to provide a 30 p.s.i. input along the "start" line 103, the pressure at port 83*b* opposes but does not overcome the pressure at port 83*e*, both of which are 30 p.s.i. The spool in the valve 83 tends to remain in the left-hand position, and the valve 83 delivers pressure at 30 p.s.i. from 83*a* to 83*c* and the pneumatic resistor 84. This resistor permits a slow build-up of pressure at port 82*e*, and this slowness provides the time constant of the one-shot 80. When the pressure at port 82*e* has built up so that it is greater than the 7 p.s.i. bias at port 82*b* the spool in valve 82 shifts to the left from its normal rightmost position and delivers a pressure of 30 p.s.i. to the line 102 and to the valve 50 at port *e*. At the same time, the 30 p.s.i. is removed from 82*d* and 83*e*, and the unopposed pressure at port 83*b* drives the spool within the valve 83 to the right, thereby venting the pressure introduced at 83*c* and removing the pressure from the resistor 84. As the pressure subsides in port 82*e*, the 7 p.s.i. bias at port 82*b* returns the spool in the valve 82 to the rightmost position where it pressurizes the port 82*d* and returns 30 p.s.i. pressure to the port 83*e*. This pressure opposes but does not overcome the 30 p.s.i. pressure applied at port 83*b*, assuming that the operator is still holding the control valve 81 in a position to supply air to the "start" line 103. Thus it will be seen that the one-shot 80 has delivered a pulse to the line 102, the duration of which pulse depends on the time constant of the one-shot 80 so long as the operator has held the valve 81 in the "start" position for a time longer than this time constant. Since the operation of the one-shot 80 is very quick, the duration of the input pulse on line 103 is normally maintained by manual operation of the valve 81. Eventually, when the operator allows the control valve 81 to return to its "off" position removing pressure from the port 83*b*, the unopposed pressure at port 83*e* returns the spool to its normal left position, and the one-shot multivibrator 80 remains stable in this condition awaiting another "start" pulse before it operates again.

The valve 50 is operated by information from two different sources. The "start" information enters at port 50*e* from the one-shot 80, but there is also "stop" information from other sources which will be described hereinafter. Such "stop" information is delivered as pressure to the port 50*b*, and normally holds the spool within the valve 50 in the left position so that 35 p.s.i. pressure is delivered from port 50*a* to port 50*d* to energize the inhibit line 101 and block the oscillator 90 while the system is dormant. On the other hand, when "start" information is delivered to port 50*e*, the spool within the valve 50 is moved to the right, thereby venting port 50*d* to the atmosphere and removing pressure from the inhibit line 101. At this point, the oscillator 90 breaks into free oscillation at a rate established by its own time constants. In the practical working embodiment of the present system, the rate of oscillation is about 4 cycles per second.

*Oscillator 90*

This oscillator is bi-stable and employs two valves 91 and 92, respectively, which have mutual feedback paths 93–94 and 95–96. The components 94 and 96 are tortuous-path pneumatic resistors, and the circuit components 93 and 95 are simple tanks, having substantial internal volumes and functioning in a manner analogous to an electrical capacitor. 30 p.s.i. is supplied at the ports 91*a* and 92*a* and the valve 91 drives the spool in valve 92 through leads 105 and 106. However, the lead 106 does not connect directly to the port 92*b* but passes through an OR-gate 97. In the absence of a 35 p.s.i. pressure input on the inhibit line 101 to port 97*c*, the oscillator functions as though the OR-gate 97 were omitted and the line 106 connected directly to port 92*b*.

Whenever the spool in the valve 91 is in the left position, the spool in the valve 92 is in the right position, and while the spool in the valve 91 is in this left position, pressure is delivered to the port 92*e* to drive the spool in valve 92 to the right. In this position of the spool in valve 92, 30 p.s.i. is delivered from port 92*a* to port 92*c*, and pressure begins building up in the tank 93 through the resistor 94. When the pressure in the tank 93 exceeds the pressure in the tank 95 the spool in the valve 91 shifts to the right, thereby pressurizing line 106 and venting line 105. The pressure in line 106 enters the port 97*b*, comes out 97*a* and enters port 92*b* and drives the spool in the valve 92 to the left. This movement of the spool in the valve 92 vents pressure in the port 92*c* and pressurizes 92*d*, thereby building up pressure in the tank 95 through the resistor 96 while bleeding pressure in the tank 93 through the resistor 94. Thus, eventually the spool in the valve 91 will again be shifted to the left and the cycle will commence again. This is a free-running oscillation.

Output from the oscillator appears as a train of square pulses on the line 107, coming from the valve port 92*c*, and these pulses are delivered along the line 107 to drive the stages of the ring counter in succession as each step is enabled by the step preceding it.

When an inhibit signal in the form of 35 p.s.i. pressure delivered from the valve 50 along the line 101 blocks the oscillator 90, it does so by applying to the port 97*c* 35 p.s.i. which overcomes the 30 p.s.i. which can be presented at the port 97*b* by the valve 91. The OR-gate 97 then delivers 35 p.s.i. to port 92*b* which pressure permanently holds the spool in the valve 92 in its left position and prevents further oscillation, until the 35 p.s.i.

inhibit signal is removed, at which time the oscillator 90 resumes free oscillation.

*Ring counter 60*

The ring counter 60 steps to a new output position each time a pneumatic pulse from oscillator 90 appears on the trigger line 107. This ring counter can be reset by the application of a pressure signal on the reset line 108 which drives the spool in the valve 70 to the left, overcoming the 7 p.s.i. bias applied to port 70*b* and delivering 35 p.s.i. from the port 70*a* to the port 70*c*. This 35 p.s.i. is delivered to the line 109 and to the ports 61*b*, 62*b*, 63*b*, and 64*b* to drive the spools in these four valves to the left. Ordinarily, the spools in the valves 65, 72, 66, 73, 67, 74, 68, 75, and 69 are also all in the left positions because of the 7 p.s.i. bias applied to their respective right ends. When all of these spools in the ring counter are in the left position, the ring counter is in reset condition ready to commence counting, as follows:

Each pulse applied by the oscillator 90 to the trigger line 107 is applied to each of the ports 65*b*, 72*a*, 73*a*, 74*a*, and 75*a*, but nothing happens at any of the valves 72, 73, 74 or 75 unless there is also a signal present at its *e* port. Beginning at the first step affecting the valves 61 and 65, a trigger pulse on line 107 enters the port 65*b* and drives the spool in valve 65 to the right, thereby providing an output of 30 p.s.i. from port 65*d* along the line 111 which represents the first output of the ring counter 60. This output is derived from the source at port 65*a*. Part of the output from port 65*d* is applied to port 61*e*, and moves the spool in that valve to the right where it remains. The pressure of the pulse at port 65*b* is 30 p.s.i., which easily overcomes the 7 p.s.i. bias applied at port 65*e* through the OR-gate 71 from port 71*c*. However, when the trigger pulse disappears from the line 107, the spool in the valve 65 returns to the left under the urging of the bias applied at port 65*e*, and in so doing applies 30 p.s.i. from port 65*a* to port 61*a* through port 65*c*. Since there is no force tending to return the spool in valve 61 to the left, except when a reset pulse appears on the line 108, the spool in valve 61 continuously connects port *a* with port *c*, thereby applying 30 p.s.i. to OR-gate 71 at port *b*. This pulse augments the 7 p.s.i. bias applied at port 65*e*, but it also drives the spool in valve 72 to the right against the 7 p.s.i. bias applied at port 72*b*. The 30 p.s.i. pressure remains continuously applied to port 72*e* until the whole ring counter is reset, and therefore the spool in valve 72 remains in the right position. The next cycle of the oscillator 90 applies a pulse to trigger line 107 which pulse can pass through the enabled valve 72 from port *a* to port *c*, and thereby drive the spool in valve 66 to the right against the opposing 7 p.s.i. bias applied to port 66*e* through OR-gate 85. The spool in valve 66 moves to the right, thereby applying 30 p.s.i. from port *a* to port *d* and delivering an output along lead 112, which is the second output of the ring counter. Part of this same output is applied to valve port 62*e* to drive its spool to the right where it remains until a reset signal is applied to port 62*b* at the end of the complete cycle of operation.

When the second pulse in the trigger line 107 dies away, the 7 p.s.i. bias applied through ports 85*c* and 66*e* returns the spool in valve 66 to the left position and thereby applies 30 p.s.i. from port 66*c* through port 62*a* and to port 62*c*. The output from the port 62*c* drives the spool in valve 73 to the right against the 7 p.s.i. bias applied at port 73*a* and holds the spool in valve 73 in the right position until the whole ring counter is reset.

The third pulse is applied through trigger line 107 to port 73*a* and is delivered from port 73*c* into valve 67. Its spool is moved to the right while the third trigger pulse is still present, thereby providing a 30 p.s.i. output at port 67*d*, and this pulse in line 113 constitutes the third output of the ring counter, and also moves the spool in valve 63 to the right. When the third oscillator pulse decays, the spool in valve 74 is returned to the left by the 7 p.s.i. bias applied at port 86*c*, and thereby applies 30 p.s.i. from port 67*a* through port 63*a* and 63*c* and into port 74*e* to drive the spool in valve 74 to the right, thereby connecting the ports 74*a* and 74*c* to enable the fourth stage of the ring counter 60 by driving the spool in valve 68 to the right.

The fourth pulse from the trigger line 107 enters the valve 74 at *a* and leaves it at *c* and enters valve 68 at *b*, drives it spool to the right and delivers 30 p.s.i. to the fourth output of the ring counter at line 114 from port 68*d*. When the fourth pulse decays, the spool in valve 68 is returned to the left position by the 7 p.s.i. bias applied to port 87*c*, and thereby an output of 30 p.s.i. is delivered from port 68*a* through port 68*c*, port 64*a*, and port 64*c*, and into port 75*e* to drive the spool in valve 75 to the right and thereby enable the fifth stage of the ring counter.

The fifth pulse from the trigger line 107 passes through valve ports 75*a* and 75*c* and drives the spool to the right in the valve 69. This motion of the valve 69 places the fifth output pulse of the ring counter on line 115, where the pulse remains until the fifth trigger pulse decays and the 7 p.s.i. bias applied to port 69*e* returns the valve 69 to the left.

The conditions under which a reset pulse is applied through the reset lead 108 to the valve 70 will be described hereinafter, but the effect thereof is to drive the spool in valve 70 to the left against the 7 p.s.i. bias normally holding it in the right-hand position. When this occurs, 35 p.s.i. is applied through the port 70*a* to the port 70*c* and to the various branches of the RESET line 109 which resets the spools in valves 61, 62, 63, and 64 to the left-hand positions, where they remain until a subsequent cycling of the ring counter 60. All of the other spools in the various valves of the ring counter 60 are reset by the 7 p.s.i. bias applied to their right ends, so that in the reset condition of the ring counter the spools in all of the valves are in the leftmost positions.

*Cylinder actuator operation*

Beginning with the assumption that all of the cylinder actuators 11, 12, 13, 14, 19, 21, 22, 23, and 24, are in their retracted positions, the gauge scale 3 reads zero at the index marked 4. As the oscillator 90 delivers its first pulse to the ring counter 60 an output appears on the first output line 111 and this output drives the spool in the valve 59 to the right where it remains until a later date, as will be described hereinafter. This same output on line 111 is delivered to port 29*e* and drives the spool in valve 29 to the left, thereby removing the pressure from port 19*d* of the retract cylinder and applying 30 p.s.i. pressure from port 29*a* to port 19*c* to advance the retract cylinder to its rightmost position where it remains until reset by a pulse from the line 120. Note that the gauge scale 3 was not advanced by the first output pulse from the ring counter on the line 111. It still reads zero.

The second pulse from the oscillator 90 is applied to port 31*e* through line 112, and at the same time this second output pulse is applied to output port 51*b* temporarily driving the spool in valve 51 to the right where it remains until the third output pulse from the ring counter is applied to port 51*e*. This, in turn, connects ports 51*a* and 51*d* along line 121, for the purpose hereinafter stated. The second ring counter pulse which is applied to port 31*e* drives the spool in valve 31 to the left and thereby removes the 30 p.s.i. pressure from 21*d* and applies it to port 21*c*, thereby advancing cylinder actuators 21 and 11. This action advances the gauge head 25 by 8 units, meaning 8 thousandths of an inch in the present example, and the cylinder 11 advances the gauge scale 3 by eight divisions so that the number 8 position on the scale 3 is opposite the pointers 4. At this point, one of three things happens, If the gauge head 25 does not touch the workpiece W, or just barely touches it, the gauge head 25 will deliver a 30 p.s.i. signal from the port 25*c* through an OR-gate 45 and into the line 126 for the purpose hereinafter discussed. If the gauge head 25 bottoms hard upon the workpiece W, it will deliver an output of 30 p.s.i. along the "too long" line from the port 25*b* through the OR-gate 45 into the line 126 and also into the line 127. According to the third alternative, if the gauge head touches the workpiece W and deflects the internal mechanism of the gauge head 25 to its null position (indicating a correct measurement of the workpiece W) then outputs would be delivered at both of the ports 25*c* and 25*b*, but at a pressure level reduced below 30 p.s.i., so that the outputs along the lines 126 and 127 would be substantially less than 30 p.s.i., for instance 23 p.s.i.

Figure 6:
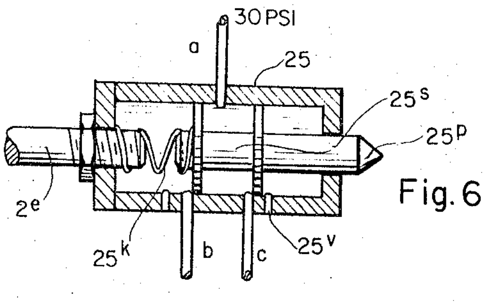
FIG. 6 is a cross-sectional detail view showing the structure of a gauge head suitable for use in the above embodiment.

In order to understand the operation of the gauge head, reference is made to FIG. 6. This figure shows the gauge head 25 fixed on the end of the rod 2*e* and including a spool 25*s* having a measuring point 25*p*. A coiled spring 25*k* yieldably urges the spool to the right-hand position in the absence of any mechanical pressure applied in a leftward direction at the point 25*p*. This spring could, of course, be replaced by a small pneumatic bias pressure introduced into the gauge head. The 30 p.s.i. input to the port 25*a* normally passes the spool and is connected to output port 25*c* to provide a "too short" signal when the point 25*p* is out of contact with the workpiece W. On the other hand, if enough pressure is applied to the point 25*p* to move the spool 25*s* to the left until it bottoms on the end of the rod 2*e*, the valving action is reversed and the port 25*c* is vented through the right vent 25*v*, while the port 25*b* is pressurized at 30 p.s.i. In between these two extremes when the spool is centered with respect to the port 25*a*, the structure is such that a certain amount of pressure leaks past the spool into both of the ports 25*b* and 25*c*, and thereby provides less than full output in both ports, for instance, 23 p.s.i. (in the present example) which indicates a proper null position of the gauge head 25. It will be recalled that after the first two pulses have passed from the ring counter 60 the gauge head 25 is then extended 8 thousandths of an inch. If at this instant the point 25*p* has been depressed by the workpiece so as to center the spool 25*s* with respect to the port 25*a*, the system is nulled, and will operate to turn itself "off" and take no further action, in the manner to be discussed below.

*"Too short" sequence of operation*

Assuming that on the second output of the ring counter 60 the first increment cylinder 21 was advanced 8 units, but that the tip 25*p* did not touch the workpiece W, a "too short" signal would be present at port 25*c*, this signal comprising 30 p.s.i. delivered through the line 126 to the port 57*b*. This pressure overcomes the regulated 27 p.s.i. pressure delivered from the regulator 55 through the OR-gate 56 to the port 57*e* driving the spool in valve 57 to the left. This movement connects port 57*a* to port 57*d*, but since no line is connected to the latter, nothing happens.

Everything remains in such condition until the second pulse from the oscillator 90 decays. When the third trigger pulse from the oscillator 90 initiates the third output pulse from the ring counter 60, this pulse on line 113 drives the spool in valve 51 to the left thereby disconnecting the ports 51*a* and 51*d*. The third output on line 113 drives the spool in the valve 52 to the right and connects the port 52*a* with port 52*d*. The third output on line 113 also drives the spool in valve 32 to the left, thereby depressurizing ports 12*d* and 22*d* and pressurizing ports 12*c* and 22*c*. As a result, these actuators are advanced and the scale 3 is extended four additional divisions so that it now reads 12, and the gauge head 25 is extended 4 thousandths of an inch further to a total of 12 thousandths of an inch. If the output signal from the gauge head 25 is still a "too short" signal, a similar sequence is repeated when the fourth output appears on line 114, thereby driving the cylinder actuators 13 and 23 to extended position and enabling valve 53 by connecting port 53*a* with port 53*d* while disabling valve 52 and blocking the path between the ports 52*a* and 52*d*. If the gauge still reads "too short" a similar cycle is repeated to extend actuators 14 and 24 when the fifth output from the ring counter appears on line 115, and at the same time connecting port 54*a* with port 54*d*, while disconnecting port 53*a* from 53*d*.

*"Too long" sequence of operation*

The following sequence occurs when a "too long" signal appears at port 25*b* of the gauge head after any of the cylinder actuators 21, 22, 23, or 24 has been extended. Recalling that the first output pulse on line 111 extended the retract cylinder 19, and moved the spool in the valve 59 to the rightmost position; and further recalling that the second output pulse of the ring counter along line 112 pressurized the valve port 31*e* to extend the actuator cylinders 11 and 21 8 units while at the same time moving the spool in the valve 51 to the right to connect the ports 51*a* and 51*d*, if at this instant the gauge head point 25*p* bottoms heavily against the workpiece W and drives the spool 25*s* all the way to the left in the gauge head 25, then the port 25*c* will be vented and the port 25*b* will be pressurized to 30 p.s.i. to deliver a "too long" signal through the OR-gate 45 to the line 126, and also to deliver a 30 p.s.i. signal to the line 127. The signal appearing on the line 126 is applied to valve port 57*b* and is able to overcome the 27 p.s.i. regulated pressure applied to port 57*e*, thereby moving the spool in the valve 57 to the left and breaking the connection between port 57*a* and port 57*c*. As a result, the spool in the valve 58 is returned to the right-hand position by the 7 p.s.i. bias applied at port 58*e*. Moreover, pressure is applied at 30 p.s.i. from the line 127 through the ports 58*a* and 58*c* into the RETRACT line 128. This pressure passes through the valve ports 51*a* and 51*d* into the line 121, through the OR-gate 41 and into the port 31*b*. When the output pulse disappears from the second ring counter output on line 121, the above pressure applied at port 31*b* moves the spool in valve 31 to the right, thereby repressurizing ports 11*d* and 21*d* and venting ports 11*c* and 21*c* to thereby return the actuator cylinders 11 and 21 to retracted position since the indication was that the 8-unit advance was "too long."

As another example, if a "too short" signal had been delivered by the gauge head 25 when the cylinder 21 advanced the head 8 thousandths of an inch, then upon the third output pulse from the ring counter 60, the cylinder actuators 12 and 22 would have been advanced, thereby advancing the head 25 an additional 4 units to a total of 12 thousandths of an inch. At the same time, the gate 51 would have been disabled by the third ring counter pulse and the gate 52 would have been enabled. If at this time a "too long" pulse was delivered by the head 25, 30 p.s.i. would have been delivered through the line 127 to valve 58; through the line 128; through the valve ports 52*a* and 52*d* into the line 122; through the OR-gate 42 and the port 32*b* to retract the cylinder actuators 12 and 22.

After a "too long" signal has retracted an actuator, upon a successive output of the ring counter, the next succeeding actuator cylinder is advanced, and if after it is advanced a "too long" signal is delivered, this cylinder actuator which was just advanced is immediately retracted. Then upon the succeeding output of the ring counter a smaller increment is advanced, and a different one of the gates 51, 52, 53, and 54 is enabled, whereby through the just-enabled gate a signal can be delivered from the "too long" line 127 and the valve 58 to retract the just-advanced actuator cylinder.

*Null sequence of operation*

The third alternative occurs when a certain number of cylinder actuators 21, 22, 23, and/or 24 have been advanced and the gauge head is positioned just right, namely such that the spool 25s has been centered with respect to input port 25a, FIG. 6. The positions of the ports 25b and 25c are located in the body of the gauge head 25 so as to permit a measurement tolerance of about one-half of a measuring unit on each side of a perfect measurement as being sufficiently close to null the system. Assuming that the cylinder actuator 21 has advanced the gauge head 8 thousandths of an inch, and that in this position the gauge head spool is centered, an output will appear at both the "too long" port 25b and at the "too short" port 25c, but this signal will not be 30 p.s.i. For example, in the working embodiment of the present system enough air leaks past the two lands on the spool 25s to provide a composite signal of 23 p.s.i. at the ports 25b and 25c.

Since the pressure input from the regulator 55 through the OR-gate 56 and into the port 57e is greater than the 23 p.s.i. null signal appearing on line 126, namely 27 p.s.i., the spool in the valve 57 will remain shifted to the right thus allowing a 30 p.s.i. signal to appear at the port 57c, this signal driving the spool in the valve 58 to the left against the 7 p.s.i. bias, thereby breaking and venting the retract line 128. Some of the 30 p.s.i. signal appearing at port 57c will also be delivered to port 59a. It will be recalled that the spool in the valve 59 was shifted to the right-hand position by the first output pulse of the ring counter appearing on line 111, and therefore when the pressure at port 57a is delivered to port 59c, 30 p.s.i. will appear on line 130. Part of this 30 p.s.i. signal will flow up through line 131 and through OR-gate 56, and will be introduced into port 57e to lock the spool in valve 57 in the rightmost position. A portion of the 30 p.s.i. signal on line 130 will also be introduced into port 50b, and will drive the spool in valve 50 to the left applying 35 p.s.i. from the port 50a to the port 50d, thereby to INHIBIT line 101, which connects to the port 97c in oscillator 90. This inhibit signal prevents further oscillation of the oscillator 90, and in this way, the entire system is blocked. It remains in this condition until a manual reset signal is applied to the line 104 by manual operation of the control valve 81.

A similar sequence of events would have occurred if the null condition had been sensed by the gauge head after any of the other actuator cylinders, such as cylinders 22, 23, or 24, had just been actuated.

*Manual reset sequence*

Recapitulating the null condition, wherein an output has been delivered from the 30 p.s.i. source at port 57a through ports 59a and 59c and into port 50b through line 130 to drive the spool in the valve 50 to the left, the system is blocked by a 35 p.s.i. inhibit signal applied through the ports 50a and 50d to inhibit further oscillation by the oscillator 90. The entre system then remains in this nulled condition until manually reset by operation of the valve 81 to apply 30 p.s.i. to the reset line 104 which renders the reset one-shot multivibrator 76 operative.

The RESET one-shot 76 operates in the same way as the START one-shot multivibrator 80 described above. Before the one-shot 76 is pulsed by the line 104, the spool in the valve 77 is normally in the rightmost position, shown by the arrow N, under the influence of the 7 p.s.i. bias into the port 77b. The spool in the valve 78 is normally in the leftmost position, shown by the adjacent arrow N, because it was left in that position at the end of a previous operation of the one-shot 76. In these spool positions, 30 p.s.i. is applied to the port 78e from the ports 77a and 77d. When a 30 p.s.i. signal appears in line 104, this signal is introduced at port 78b and opposes but does not immediately overcome the 30 p.s.i. signal at port 78e. Therefore, the spool in valve 78 remains temporarily in the leftmost position. In this position, part of the signal in line 104 passes through ports 78a and 78c and into a resistance 79 which allows the pressure to begin to build up in the port 77e. When the pressure at this port has exceeded the 7 p.s.i. bias at port 77b, the spool in valve 77 shifts to the left position and thereby removes the 30 p.s.i. pressure from ports 77d and 78e, thus allowing the spool in valve 78 to move to the right position to remove the 30 p.s.i. signal from the resistance 79. The shifting of the spool in valve 77 from its normal rightmost position to the left position delivers an output pulse of 30 p.s.i. to the reset line 108, and the duration of this output signal depends on how long the spool stays in the left position. Since the spool in valve 78 is now in the right position, the pressure at port 77e begins decaying through the resistor 79 and the now-vented port 78c. The time that it takes for this pressure to decay determines the length of time the spool in valve 77 is in the left position, and therefore determines the duration of the reset output pulse to line 108. When the pressure has dissipated through the resistance 79 from port 77e sufficiently that it falls substantially below 7 p.s.i., the spool in the valve 77 returns to its normal rightmost position, thereby terminating the output pulse on line 108, and again pressurizing the ports 77d and 78e. So long as the operator holds the switch 81 in the reset position for a longer time than the time constant of the one-shot 76, the duration of the output pulse to line 108 depends only upon the internal time constant of the one-shot 76. Since this time constant is only a fraction of a second, the operator automatically meets this condition. When he finally releases the switch 81 to return it to its normal "off" condition, the spool in valve 78 finds the pressure at port 78e unopposed by any pressure at port 78b, and therefore the spool in valve 78 returns to its normal leftmost position and the one-shot 76 has completed its function.

The reset output pulse delivered to reset line 108 completes all of the necessary resetting functions of the system as follows:

It returns the spool in valve 59 to its leftmost position where it remains until the ring counter 60 delivers its first output pulse on line 111. The output pulse also travels down reset line 108 and drives the spool in valve 70 to the left against the 7 p.s.i. bias applied port 70b and thereby introduces 35 p.s.i. from port 70a into port 70c and line 109. As related above, this 35 p.s.i. signal drives the spools in valves 61, 62, 63, and 64 to the left, which is their normal reset position, so that the ring counter is now completely reset. In addition, the reset signal from line 108 travels upwardly along line 125 and resets the spool in valve 54 to the left, since there is no sixth position of the ring counter to accomplish resetting of this spool in the manner in which the spools in valves 51, 52 and 53 are reset to the left. Also, the reset pulse from line 108 travels upwardly in line 125 through the OR-gates 41, 42, 43, and 44, and proceeds to reset the spools in valves 31, 32, 33, and 34 to the rightmost position. The spool in valve 29 is reset to the rightmost position by the pulse travelling through the line 120. When the spools in valves 29, 31, 32, 33, and 34 are in the rightmost positions, every cylinder actuator 11, 12, 13, 14, 19, 21, 22, 23, and 24 is fully retracted.

The system is now fully reset, and the oscillator 90 which drives the ring counter 60 remains inhibited since the spool in valve 50 remains in the left position to which it was driven by the null signal from the gauge head 25 when a null condition was reached. The oscillator 90 remains so inhibited until a new "start" cycle is commenced by manual operation of the valve 81 and the accompanying operation of the "start" one-shot 80 which delivers an output signal to line 102 to drive the spool in the valve 50 to the right and thereby remove the 35 p.s.i. inhibit signal from INHIBIT line 101.

The present invention is not to be limited to the exact embodiment illustrated in the drawings, for obviously changes may be made therein within the scope of the following claims.

I claim:

1. A dimension measuring device comprising:
(a) a sensing head having a member movable to a "null" position wherein the head delivers a null signal;
(b) step-by-step means for advancing the head through graduated increments in the absence of a "null" signal; and
(c) inhibit means connected to the sensing head to receive said "null" signal, and connected to said step-by-step means for inhibiting further advance of the head.

2. A dimension calipering device comprising:
(a) a support for a workpiece;
(b) a sensing head having a probe member movable by contact with the workpiece to a null position wherein the head delivers a "null" signal;
(c) step-by-step means for advancing the head toward the workpiece through gradually increasing total increments in the absence of a null signal;
(d) inhibit means connected to the sensing head to receive said "null" signal, and connected to said step-by-step means for inhibiting further advance of the head; and
(e) gauge means for indicating the measured dimension when the system is nulled.

3. A trial-and-error system for testing an analog value by repeatedly sampling the value in increments until a correct increment is arrived at, said system comprising:
(a) a group of tandem-connected actuators;
(b) a sensing head connected to be extended by the group of actuators through successive increments depending upon the combination of actuators extended, the head having means for delivering signals respectively indicating that an increment through which it is extended is "too long," "too short," or "null" to halt the sampling sequence when the increment is correct;
(c) gate means coupled to each actuator to incrementally extend or retract it in response respectively to "too short" or "too long" signals from the head; and
(d) step-by-step sequence means having outputs coupled successively to the gate means to energize actuators in a succession, and the null signal being connected to the sequence means to cease the count when the correct increment has been arrived at.

4. In a system as set forth in claim 3, said step-by-step sequence means comprising a ring counter and cyclic means for pulsing the ring counter at a periodic rate, and the cyclic means having an inhibit circuit coupled to receive said null signal which blocks the cyclic means.

5. In a system as set forth in claim 3, said actuators having different increments of movement including a first actuator contributing a most significant increment and ending with a final actuator contributing a least significant increment, the sequence means successively operating each actuator by extending it and at the same time enabling the gate means coupled to that actuator so that if the head delivers a "too-long" signal to that gate, the associated actuator will be retracted prior to the next count by the sequence means.

6. In a system as set forth in claim 5, logic circuit means connected to said sensing head and including a valve biased in a normal position but displaceable therefrom by a "too-long" or a "too-short" signal and the valve being coupled to operate said sequence means to inhibit further counting when in normal position and when receiving a null signal.

7. A trial-and-error system for measuring an analog value by repeatedly sampling the value in increments until a correct increment is arrived at, and for providing a digital indication of the measured value, said system comprising:
(a) at least two groups of tandem-connected actuators, each actuator in the first group being slaved to a corresponding actuator in the second group;
(b) a sensing head connected to be extended by the actuators in the second group through successive increments depending upon the combination of actuators extended within the second group, the head having means for delivering signals respectively indicating that an increment through which it is extended is "too long," "too short," or "null" to halt the sampling sequence when the increment is correct;
(c) gauge means operated by the first actuator group and calibrated in terms of the increments through which the second actuator group extends the gauge head;
(d) gate means coupled to each slaved pair of actuators to incrementally extend or retract it in response respectively to "too short" or "too long" signals from the head; and
(e) step-by-step sequence means having outputs coupled successively to the gate means to energize the pairs of slaved actuators in a succession beginning with the actuator pair having the largest incremental motion, and the null signal being connected to the sequence means to cease the count when the correct increment has been arrived at.

8. In a system as set forth in claim 7, said step-by-step sequence means comprising a ring counter and cyclic means for pulsing the ring counter at a periodic rate, and the cyclic means having an inhibit circuit coupled to receive said null signal which blocks the cyclic means.

9. In a system as set forth in claim 8, manual control means for starting and resetting the system, and having separately selectable "start" and "reset" signals; and control circuitry connected to receive these signals and coupled to said gate means and to said cyclic means to reset the actuators in response to "reset" signals, and to defeat the inhibit circuit of the latter in response to "start" signals.

10. A trial-and-error system for calipering a dimension of a workpiece by repeatedly sampling its value in increments until a correct increment is arrived at, and for providing a digital indication of the measured dimension, said system comprising:
(a) means for supporting said workpiece;
(b) at least two groups of tandem-connected actuators opposite said supporting means and each actuator in the first group being slaved to a corresponding actuator in the second group;
(c) a sensing head connected to be extended by the actuators in the second group through successive increments depending upon the combination of actuators extended within the second group, the sensing head having means for delivering signals respectively indicating that an increment through which it is extended is "too long," "too short," or "null" to halt the sampling sequence when the increment is correct;
(d) gauge means operated by the first actuator group and calibrated in terms of the increments through which the second actuator group extends the gauge head;
(e) gate means coupled to each slaved pair of actuators to incrementally extend or retract it in response respectively to "too short" or "too long" signals from the head; and
(f) step-by-step sequence means having outputs coupled successively to the gate means to energize the pairs of slaved actuators in a succession beginning with the actuator pair having the largest incremental motion, and the null signal being connected to the sequence means to cease the count when the correct increment has been arrived at.

11. In a system as set forth in claim 10, a reciprocable actuating means coupled to the second group of actuators and operative to retract the latter and the sensing head away from the workpiece when the calipering operation is completed to facilitate changing of the workpiece.

12. In a system as set forth in claim 10, said step-by-step sequence means comprising a ring counter, and cyclic means for pulsing the ring counter at a periodic rate, and the cyclic means having an inhibit circuit coupled to receive said null signal which blocks the cyclic means.

13. In a system as set forth in claim 12, said ring counter comprising multiple similar counting stages all pulsed in unison by said cyclic means to advance the count, and the stages including binary valve means normally occupying a reset condition and each having an input for changing the valve means to a position operative to deliver an output count signal, a gate connected between said input of the valve means and said cyclic means and the gate being connected to a preceding valve means to be opened thereby when that valve means is in operative position; and means for resetting the valves.

14. In a system as set forth in claim 12, said cyclic means comprising a free-running oscillator having a feedback circuit to maintain oscillation; and an inhibit gate in series with said feedback circuit to block it in response to a null signal.

15. In a system as set forth in claim 10, said sensing head comprising valve means having a workpiece contacting probe extending therefrom and operating a valve, means urging the probe to extended position wherein the value delivers a "too-short" signal, and the probe being capable of being partly displaced to a position in which the valve delivers a "null" signal or fully displaced to a position in which the valve delivers a "too-long" signal.

16. In a system as set forth in claim 15, logic circuit means connected to said sensing head and including a valve biased in a normal position but displaceable therefrom by a "too-long" or a "too-short" signal and the valve being coupled to operate said sequence means to inhibit further counting when in normal position and when receiving a null signal.

17. In a system as set forth in claim 16, said logic circuit including means connecting said sensing head to said gate means to retract the pairs of actuators in response to a "too-long" signal.

18. A pneumatic trial-and-error system for measuring an analog value by repeatedly sampling the value in increments until a correct increment is arrived at, and for providing a digital indication of the measured value, said system comprising:

(a) at least two groups of tandem-connected cylinder actuators, each actuator in the first group being slaved to a corresponding actuator in the second group;

(b) a pneumatic sensing head connected to be extended by the actuators in the second group through successive increments depending upon the combination of actuators extended within the second group, the head having means for delivering pneumatic signals at two outputs respectively indicating that an increment through which it is extended is "too long" or "too short," and for indicating when the increment is correct by delivering a "null" signal at reduced pressures at both outputs to halt the sampling sequence;

(c) gauge means operated by the first actuator group and calibrated in terms of the increments through which the second actuator group extends the gauge head;

(d) gate means coupled to each slaved pair of actuators to incrementally extend or retract it in response respectively to "too short" or "too long" signals from the head;

(e) step-by-step sequence means having outputs coupled successively to the gate means to energize the pairs of slaved actuators in a succession beginning with the actuator pair having the largest incremental motion; and (f) valve means connected to the head and responsive to "null" signals of reduced pressure to cease the count when the correct increment has been arrived at.

19. In a system as set forth in claim 18, said step-by-step sequence means comprising a ring counter and cyclic means for pulsing the ring counter at a periodic rate, and the cyclic means having an inhibit circuit coupled to receive said null signal which blocks the cyclic means.

20. In a system as set forth in claim 19, manual control means for starting and resetting the system, and having separately selectable "start" and "reset" pneumatic signals; one-shot oscillator means for receiving the latter signals and delivering output pulses of definite duration; reset circuitry for receiving a reset output pulse and delivering it to the gate means to reset the actuators, to the ring counter to reset the latter, and to the cyclic means to operate its inhibit circuit; and start circuitry connected to receive a start pulse and deliver it to the cyclic means to render the inhibit circuit inoperative.

References Cited by the Examiner

UNITED STATES PATENTS

| | | | |
|---|---|---|---|
| 2,499,665 | 3/1950 | Mestas | 33—172 X |
| 2,699,757 | 1/1955 | Tornkvist et al. | 91—167 |
| 2,969,042 | 1/1961 | Litz et al. | 121—38 |
| 3,071,758 | 1/1963 | Wolfendale | 340—187 |
| 3,193,937 | 7/1965 | Aller | 33—172 X |

RICHARD B. WILKINSON, *Primary Examiner.*

L. R. FRANKLIN, *Assistant Examiner.*